United States Patent
Jadrić et al.

(10) Patent No.: US 6,211,792 B1
(45) Date of Patent: Apr. 3, 2001

(54) METHOD AND APPARATUS DETECTING A FAILED THYRISTOR

(76) Inventors: Ivan Jadrić, 2120 Carlisle St.; Harold R. Schnetzka, 280 Estate Dr., both of York, PA (US) 17404; Gregory K. Beaverson, 3882 Pond Dr., York, PA (US) 17402

(*) Notice: Subject to any disclaimer, the term of this patent is extended or adjusted under 35 U.S.C. 154(b) by 0 days.

(21) Appl. No.: 09/373,500

(22) Filed: Aug. 13, 1999

(51) Int. Cl.[7] .................................................. G08B 21/00
(52) U.S. Cl. .......................... 340/660; 340/662; 340/663; 318/800
(58) Field of Search .................................... 340/635, 644, 340/645, 657, 660, 661, 663; 318/729, 800, 812; 327/440, 447; 361/56, 91.8, 93.7

(56) References Cited

U.S. PATENT DOCUMENTS

| | | | |
|---|---|---|---|
| 3,987,214 | 10/1976 | Leowald et al. | 327/475 |
| 4,075,346 | 2/1978 | Riley | 363/50 |
| 4,237,531 | 12/1980 | Cutler et al | 363/58 |
| 4,238,821 | 12/1980 | Walker | 363/58 |
| 4,393,442 | 7/1983 | Kähkipuro | 363/63 |
| 4,424,544 | 1/1984 | Chang et al. | 363/56 |
| 4,475,150 | 10/1984 | D'Atre et al. | 363/51 |
| 4,554,463 | 11/1985 | Norbeck et al. | 307/117 |
| 4,672,303 | 6/1987 | Newton | 323/285 |
| 4,682,278 | 7/1987 | Marquardt et al. | 363/58 |
| 4,710,692 | 12/1987 | Libert et al. | 318/729 |
| 4,742,353 | 5/1988 | Hino et al. | 378/105 |
| 4,833,628 | * 5/1989 | Curran, Jr. | 318/800 |
| 4,859,884 | * 8/1989 | Yoshino | 327/447 |
| 4,912,390 | 3/1990 | Curran, Jr. et al. | 318/812 |
| 4,928,219 | 5/1990 | Roslund et al. | 363/54 |
| 4,947,282 | * 8/1990 | Kobayashi | 361/91.8 |
| 4,959,764 | 9/1990 | Bassett | 363/16 |
| 4,982,145 | 1/1991 | Peterson | 318/596 |
| 5,057,987 | 10/1991 | Kumar et al. | 363/58 |
| 5,115,387 | 5/1992 | Miller | 363/54 |
| 5,127,085 | 6/1992 | Becker et al. | 318/434 |
| 5,151,642 | 9/1992 | Lombardi et al. | 318/779 |
| 5,262,691 | 11/1993 | Bailey et al. | 327/440 |
| 5,293,111 | 3/1994 | Weinberg | 323/222 |
| 5,365,394 | 11/1994 | Ibarguengoitia | 361/33 |
| 5,365,419 | 11/1994 | Schreiber | 363/16 |
| 5,375,028 | 12/1994 | Fukunaga | 361/93.7 |
| 5,376,830 | 12/1994 | Ashley et al. | 327/134 |

(List continued on next page.)

FOREIGN PATENT DOCUMENTS

0639885 A2   2/1995   (JP) .............................. H02M/1/092

OTHER PUBLICATIONS

A. P. Connolly et al., "DC Gate Triggering Specifications," *SCR Manual Sixth Edition*, pp. 85–86.

J. G. Kassakian et al., "Chapter 6 High Frequency Switching dc/dc Converters," *Principles of Power Electronics*, pp. 110–116.

R. L. Boylestad, Introductory Circuit Analysis, 4th Edition, pp. 626–629.

Primary Examiner—Van T. Trieu
(74) Attorney, Agent, or Firm—Finnegan, Henserson, Farabow, Garrett & Dunner, L.L.P.

(57) ABSTRACT

Methods and systems consistent with this invention detect a failed short thyristor in a solid-state controller for delivering power to a load during reduced-voltage operation. Methods and systems consistent with this invention detect a voltage across the thyristor, and indicate a failed short thyristor when the absolute value of the voltage across the thyristor remains below a threshold value during a predetermined period of time. Methods and systems consistent with this invention detect a failed open thyristor in a solid-state controller during full-voltage operation. Methods and systems consistent with this invention detect a voltage across the thyristor, and indicate a failed open thyristor when the absolute value of the voltage across the thyristor exceeds a threshold value.

28 Claims, 4 Drawing Sheets

U.S. PATENT DOCUMENTS

| | | | |
|---|---|---|---|
| 5,414,341 | 5/1995 | Brown | 323/268 |
| 5,606,482 | 2/1997 | Witmer | 361/93.7 |
| 5,617,016 | 4/1997 | Borghi et al. | 323/284 |
| 5,734,562 | 3/1998 | Redl | 363/16 |
| 5,745,352 | 4/1998 | Sandri et al. | 363/1 |
| 5,757,599 | 5/1998 | Crane | 361/56 |
| 5,796,259 | 8/1998 | Dickmander | 324/524 |
| 5,831,807 | 11/1998 | Masannek et al. | 361/93.2 |
| 5,852,556 * | 12/1998 | Kobayashi | 363/85 |

* cited by examiner

METHOD AND APPARATUS DETECTING A FAILED THYRISTOR

BACKGROUND OF THE INVENTION

1. Field of the Invention

The present invention relates to detecting a failed thyristor, and more particularly to detecting a failed thyristor in reduced voltage solid-state motor starters or controllers.

2. Description of the Related Art

Electric motors often use "thyristors," which are also known as "silicon controlled rectifiers" ("SCRs"), as part of the motors' control circuitry. A thyristor can be thought of as a switchable diode with three terminals: a gate, an anode, and a cathode. If a supply voltage that is less than a breakdown voltage is applied across the anode and cathode of the thyristor, and no "trigger" current or voltage (trigger signal) is applied to the gate, the thyristor is "off," i.e., no current flows from the anode to the cathode. If a trigger signal is applied to the gate, the voltage across the anode and cathode of the thyristor drops to a very low value in comparison to the supply voltage, and the thyristor turns "on," i.e. current flows through the thyristor from the anode to the cathode. Once on, the thyristor can remain on, provided the current through the thyristor remains above a holding current, regardless of the trigger signal at the gate. For the thyristor to turn off, the anode to cathode current must be reduced to a level below the holding current value for the device.

As is well known in the art, solid state starters, or controllers, control electric current flow from a power supply to the motor while the motor is starting. These starters have thyristor switches that gradually increase the current delivered to the motor. Using the thyristor switches, the starter regulates the time period that the thyristors conduct electricity and pass current. In other words, the starter controls when the current from the power supply is delivered to the motor. By controlling the current supplied to the motor during startup, the motor is gently brought up to full operating speed.

When an electric motor is started without such a starter, current drawn by the motor can be excessive, typically six times the steady state current, i.e., the current once it reaches full operating speed. This large current inrush can cause a voltage drop in the power distribution system, causing lights to dim and flicker and disturbing nearby equipment. In addition, the motor torque may rise quickly and oscillate, which can adversely affect the mechanical components of the motor or anything coupled to it.

Failure of a thyristor in the starter may also result in poor motor functioning. Thyristor failures generally result in unbalanced power supply conditions, which may lead to large torque oscillations that can damage mechanical couplings and gears driven by the motor.

Therefore, there is a need to be able to detect a failed thyristor during operation of a motor.

SUMMARY OF THE INVENTION

Methods and systems consistent with this invention detect a failed short thyristor in a solid-state controller for delivering power to a load during reduced-voltage operation. Methods consistent with this invention detect a voltage across the thyristor, and indicate a failed short thyristor when the absolute value of the voltage across the thyristor remains below a threshold value during a predetermined period of time. Systems consistent with this invention comprise a voltage detector circuit comprising a resistor, a capacitor, and a light emitting diode for detecting a voltage across the thyristor; and a microprocessor coupled to the voltage detector circuit for indicating a failed short thyristor when the absolute value of the voltage across the thyristor remains below a threshold value during a predetermined period of time.

Methods and systems consistent with this invention detect a failed open thyristor in a solid-state controller during full-voltage operation. Methods consistent with this invention detect a voltage across the thyristor, and indicate a failed open thyristor when the absolute value of the voltage across the thyristor exceeds a threshold value. Systems consistent with this invention comprise a voltage detector circuit comprising a resistor, a capacitor, and a light emitting diode for detecting a voltage across the thyristor; and a microprocessor optically coupled to the voltage detector circuit for indicating a failed open thyristor when the absolute value of the voltage across the thyristor exceeds a threshold value.

The summary and the following detailed description should not restrict the scope of the claimed invention. Both provide examples and explanations to enable others to practice the invention. The accompanying drawings, which form part of the detailed description, show one embodiment of the invention and, together with the description, explain the principles of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

The following description of embodiments of this invention refer to the accompanying drawings.

DESCRIPTION OF THE PREFERRED EMBODIMENT

Figure 1:
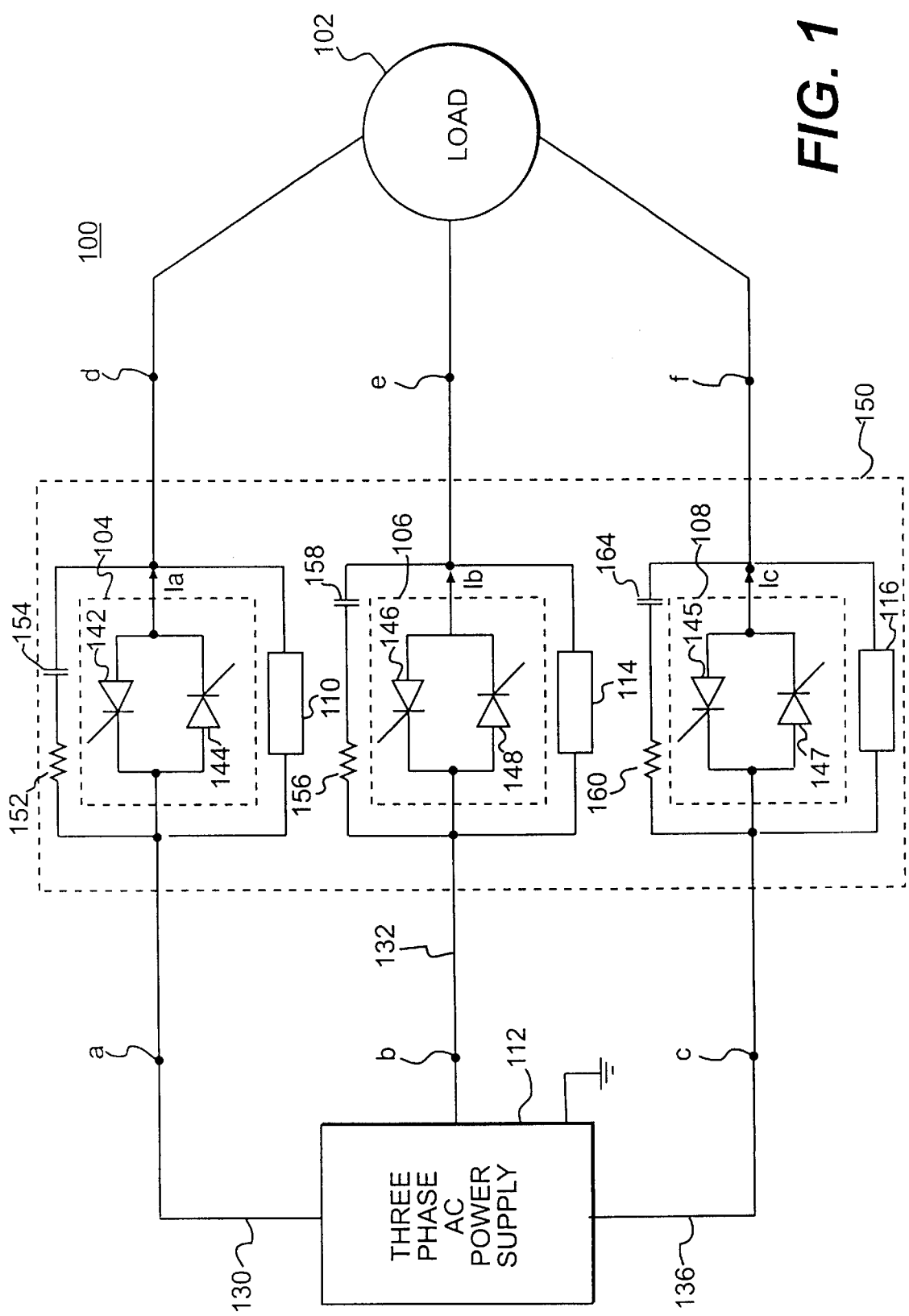
FIG. 1 is a schematic diagram, consistent with this invention, of a circuit consisting of a three phase alternating current power supply for a load with a solid-state starter or controller.

FIG. 1 is a schematic diagram, consistent with this invention, of a three phase alternating current power supply 112 for a load 102 with a reduced voltage solid state starter or controller 150. Load 102 may comprise a three phase motor, which may drive various components of a refrigeration system. The refrigeration system may include a compressor, a condenser, a heat-exchanger, and an evaporator. As mentioned above, starter 150 reduces the current supplied to load 102 in a well-known manner during start up or acceleration.

Three phase alternating current power supply 112 supplies load 102 via a first power supply line 130, a second power supply line 132, and a third power supply line 136. Each line carries alternating current, but each has a different phase angle. Line 130 has a first thyristor pair 104, comprising a first thyristor 142 and a second thyristor 144. Thyristors 142 and 144 are connected "back-to-back," i.e., the anode of thyristor 142 is connected to the cathode of thyristor 144, and vice versa. Similar to line 130, line 132 has a second back-to-back thyristor pair 106, and line 136 has a third back-to-back thyristor pair 108. Control circuitry for timing and triggering thyristor pairs 104, 106, and 108, is well-known and is not shown.

A resistor 152 and a capacitor 154 are connected in series, in parallel with thyristor pair 104. Resistor 152 and capacitor 154 provide a first "snubber network" to suppress high rates of change of voltage across thyristor pair 104. Likewise, a resistor 156 and a capacitor 158 provide a second snubber network for thyristor pair 106. Also, a resistor 160 and a capacitor 164 provide a third snubber network for thyristor pair 108.

In systems consistent with this invention, a first fault detector 110 is in parallel with first thyristor pair 104, a second fault detector 114 is in parallel with second thyristor pair 106, and a third fault detector 116 is in parallel with third thyristor pair 108. Each detector 110, 114, and 116 detects faults in thyristor pairs 104, 106, or 108, respectfully.

Figure 3:
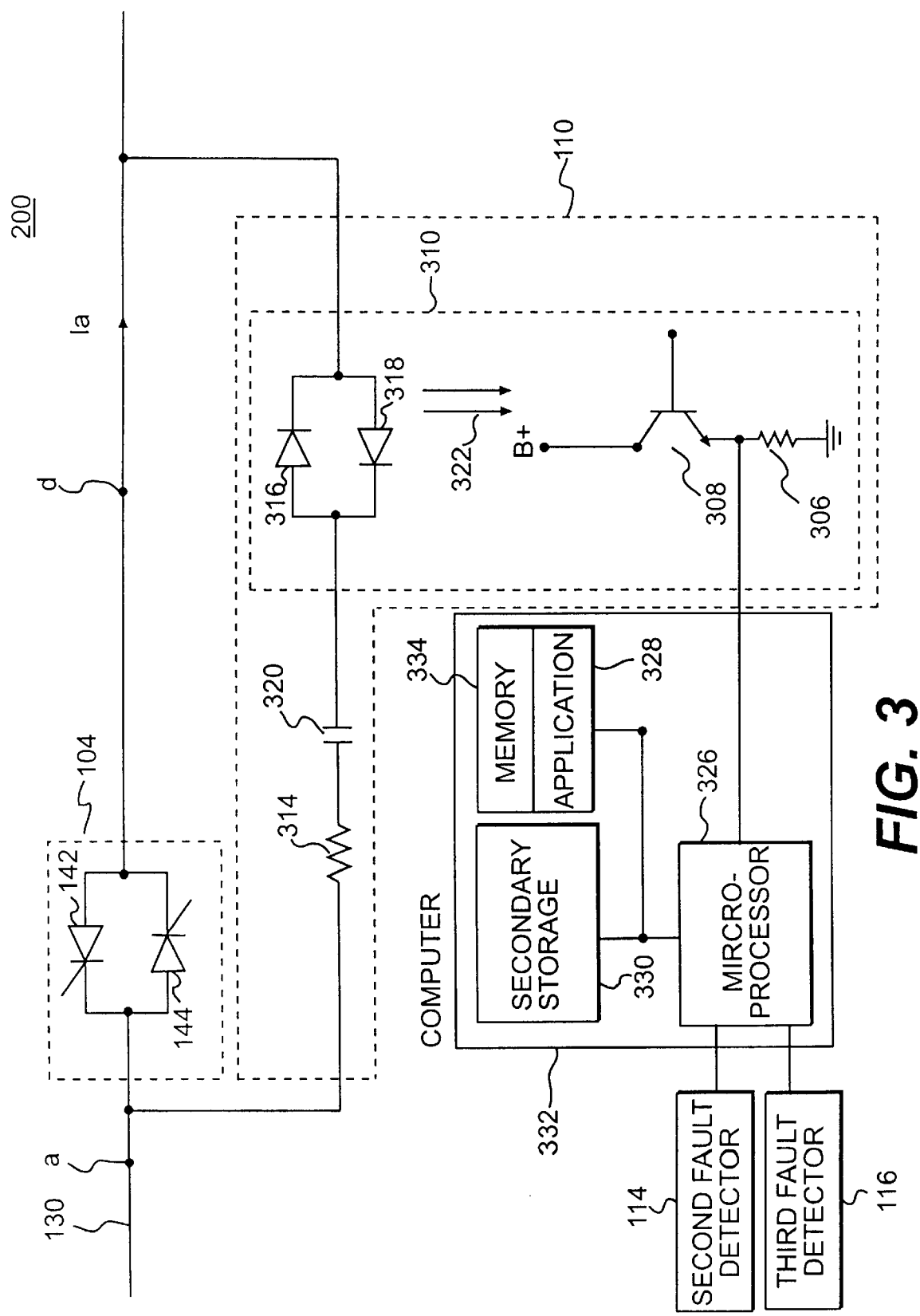
FIG. 3 is a block diagram of a computer and a more detailed circuit diagram of thyristor pair 104 in parallel with a first fault detector 110 as shown in FIG. 1.

FIG. 3 is a more detailed circuit diagram of thyristor pair 104 in parallel with first fault detector 110 as shown in FIG. 1. In systems consistent with this invention, first fault detector 110 comprises a bidirectional photo-coupler 310 in series with a capacitor 320 and a resistor 314. Bidirectional photo-coupler 310 comprises a light emitting diode (LED) pair 316, 318 arranged in a back-to-back configuration, and an optically-sensitive bipolar junction transistor (BJT) 308. The emitter of transistor 308 is connected to the input of a microprocessor 326. A pull-down resistor 306 is connected between ground and the emitter of transistor 308. The collector of transistor 308 is connected to a separate power supply B+.

FIG. 3 also depicts a data processing system comprising a computer 332 that is suitable for use with methods and systems consistent with this invention. Computer 332 includes microprocessor 326, a memory 334, and a secondary storage device 330. Memory 334 and secondary storage 330 may store application programs, such as an application 328, and data for execution and use by microprocessor 326.

The operation of fault detection circuit 110 is analyzed first when current Ia through thyristor pair 104 is non-zero, and second when current Ia is zero.

In the first case, when current Ia is non-zero, either thyristor 142 or thyristor 144 conducts and voltage Vad across thyristor pair 104 is the forward voltage drop of a thyristor, which is ideally zero. In this case, voltage Vad is insufficient to allow current to pass through detector 110 and LED pair 316, 318 do not emit a light ray 322. As a result, optically-coupled transistor 308 does not turn on, and transistor 308 outputs a logic low to microprocessor 326. Current Ia is non-zero when one of thyristors 142, 144 is triggered and conducting properly or when one of thyristors 142, 144 is shorted.

In the second case, when current Ia is zero, neither thyristor 142 nor thyristor 144 conducts and the voltage across thyristor pair 104 is not necessarily ideally zero, unlike the first case. If load 102 is a three-phase motor, voltage Vad across thyristor pair 104 is equal to the difference between voltage supplied by power supply 112 at point a and the back electromotive force (EMF) of the motor, provided the motor is rotating. Because input voltage supply 112 provides an AC source at point a, the absolute value of voltage Vad across thyristor 104 is significantly larger than zero twice per cycle.

Non-zero voltage Vad causes current to flow through first fault detector 110, i.e., through resistor 314, capacitor 320, and LED 316 or LED 318. When current flows through detector 110, one of LED pair 316, 318 conducts and emits light ray 322. Light ray 322 saturates the base of transistor 308, which conducts, outputting a logic high to microprocessor 326. Because of the AC power supply 112, there are two logic pulses every cycle of voltage at point a.

Capacitor 320 has a high impedance relative to resistor 314, which limits the current through LED pair 316, 318, resistor 314, and capacitor 320. Thus, the presence of capacitor 320 allows the power rating of resistor 314 to be small by preventing an undesirably large amount of current from flowing through fault detector 110.

Second fault detection circuit 114, and third fault detection circuit 116 operate similarly to first fault detection circuit 110. As described below, microprocessor 326 analyzes the logic pulses from fault detection circuits 110, 114, and 116 to detect if any of thyristors 142–147 has failed.

Detection of Open Thyristor Failure During Motor Steady State Speed

Figure 2:
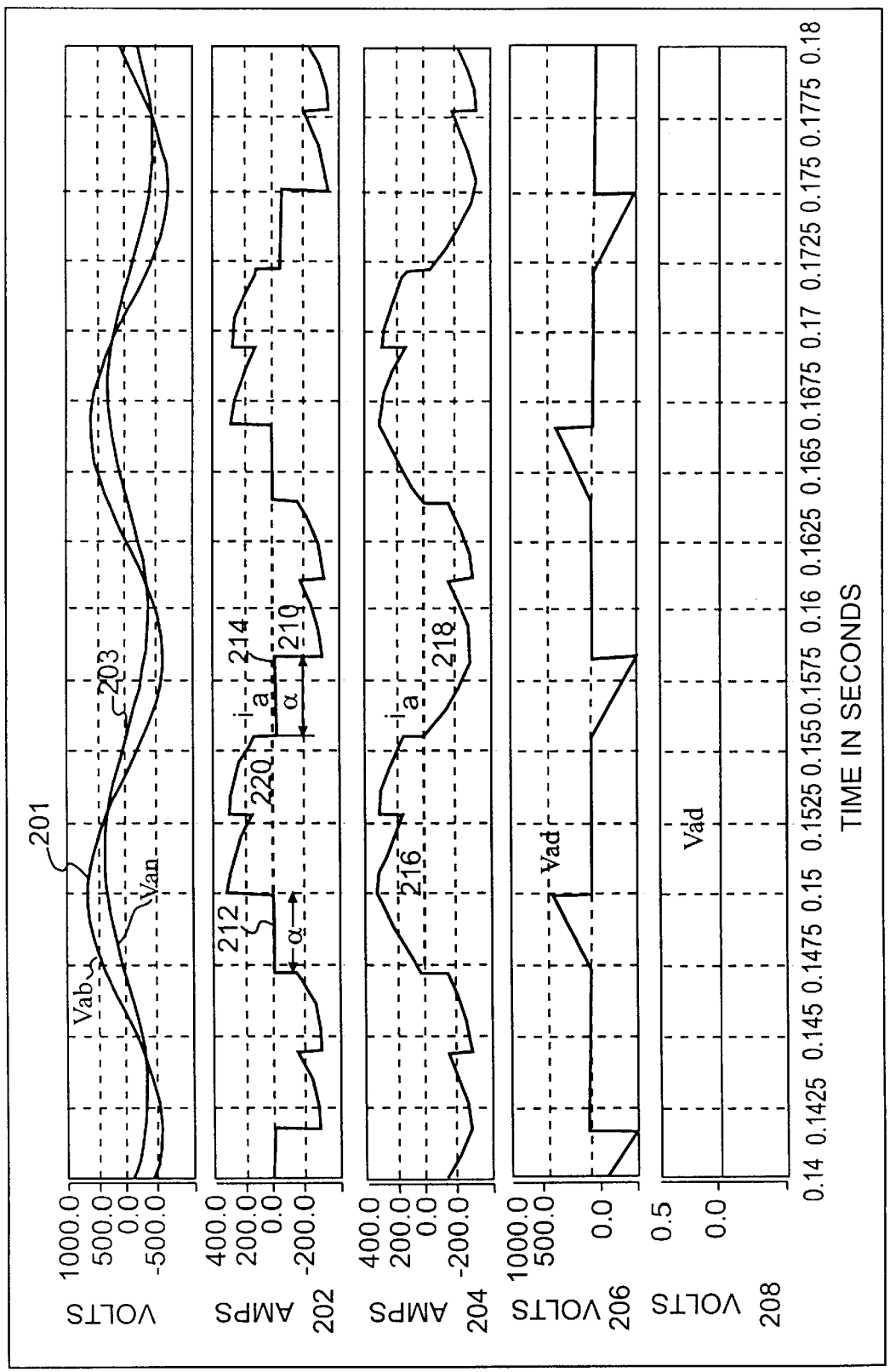
FIG. 2 is a diagram of curves representing voltage across thyristor pair 104, current through thyristor pair 104, and output voltages of power supply 112, all shown in FIG. 1, during normal and failure conditions.

Three phase power supply 112 outputs sinusoidal voltages on lines 130, 132, and 136 that have positive half cycles and negative half cycles, each at a different phase angle. FIG. 2 is a diagram of curves representing a voltage Vab between lines 130 and 132, and a voltage Van between line 130 and ground of three phase power supply 112 in FIG. 1. Curve 201 represents line-to-line voltage Vab between line 130 and 132 between points a and b in FIG. 1. Curve 203 represents line-to-neutral voltage Van between line 130 and ground. The voltage on line 130 at point a leads the voltage on line 132 at point b by 120°, which leads the voltage on line 136 at point c by 120° (a–b–c rotation).

If load 102 is a motor operating at steady state speed, starter 150 delivers full current from power supply 112 to the motor. When voltage Vab is in a positive half cycle, thyristor 144 may be triggered as early as 30 degrees later (a–b–c rotation), and a load voltage Vde follows the positive half cycle of voltage Vab. When voltage Vab is in a negative half cycle, thyristor 142 may be triggered as early as 30 degrees later (a–b–c rotation), and load voltage Vde follows the negative half cycle of voltage Vab. Thyristor pairs 106 and 108 operate similarly.

At steady state speed during normal operation, either thyristor 142 or thyristor 144 is conducting at any time. Consequently, voltage Vad across thyristor pair 104 remains ideally zero. If one of the thyristors 142, 144 fails open, however, the absolute value of voltage Vad across thyristor pair 104 would be significantly larger than zero at some point during each cycle of input voltage Van, i.e., voltage Vad pulsates. The pulses in voltage Vad creates a logic pulse that is fed to microprocessor 326. Microprocessor 326, under the direction of application 328, detects one or more logic pulses and signals an open thyristor failure in thyristor pair 104.

During steady state motor operation, methods and systems consistent with this invention detect the voltage across the thyristor, and indicate an open thyristor failure when the voltage across the thyristor does not remain below a threshold value during a predetermined period of time. The predetermined period of time may be a cycle or half a cycle of voltage Van, among other values.

During normal motor steady state operation, therefore, no current flows through fault detector 10 because current Ia is never discontinuous. Thus, no light is emitted from LED pair 316, 318, and microprocessor 326 receives no logic pulses during normal operation.

In methods and systems consistent with this invention, it is not necessary to know the exact value of voltage Vad across thyristor pair 104. It is only important to determine whether voltage Vad is continuously near zero volts, or whether it is pulsating at a value larger than the threshold value.

Microprocessor 326 may use a digital filter implemented in application program 328 to determine the average value of voltage generated by photo-coupler 310. If the average rises above a given threshold, an open thyristor indication for thyristor pair 104 is signaled.

Fault detectors 114 and 116 operate similarly to fault detector 110 in detecting faults in thyristor pairs 106 and 108, respectfully. Likewise, microprocessor 326 is connected to fault detectors 114 and 116 to detect open thyristor failures in during motor steady state.

Detection of Shorted Thyristor Failure During Motor Acceleration

If load 102 were a motor accelerating during startup, however, thyristors 142 and 144 are triggered in a delayed manner to control the current delivered to the motor. Referring again to FIG. 2, curves 202 and 204 represent current Ia through line 130 while thyristor pair 104 is triggered in a delayed manner at an angle α to reduce current delivered to load 102, assuming load 102 is resistive. Curves 206 and 208 represent voltage Vad across thyristor pair 104 while the thyristor pair is triggered in a delayed manner at an angle α. Curves 202 and 206 represent normal operation, and curves 204 and 208 represent operation during shorted thyristor failure.

When voltage Van is in a positive half cycle and thyristor 144 is not fired during angle α, then current Ia remains zero as shown by portion 212 of curve 202. When thyristor 144 is fired after angle α, then thyristor 144 conducts and current Ia increases as shown by area 220 under curve 202. When Van is in the negative half cycle and thyristor 142 is not fired during angle α, then current Ia is zero, as shown by portion 214 of curve 202. When thyristor 142 is fired at angle α, then thyristor 142 conducts and current Ia decreases as shown by area 210 under curve 202. During delay angle α, voltage Vad across thyristor pair 104 is equal to voltage Van because load 102 is resistive. If load 102 were a three phase motor, Vad would equal voltage Van minus the back electromotive force (EMF) of the motor during the delay angle α.

In FIG. 2, curve 204 represents current Ia when thyristor 142 fails short while thyristor pair 104 is triggered in a delayed manner at an angle α to reduce current delivered to load 102. Curve 208 represents voltage Vad across the thyristor pair 104 when thyristor 142 fails shorted while thyristor pair 104 is triggered in a delayed manner at an angle α to reduce current delivered to load 102. When Van is in its positive half-cycle, current Ia is non-zero and positive, no matter whether one of thyristors 142, 144 is triggered or not, as shown by area 216 under curve 204. Similarly, when Van is in its negative half-cycle, current Ia is non-zero and negative, no matter whether either of thyristors 142, 144 is triggered or not, as shown by area 218 under curve 204. Voltage Vad across thyristor pair 104 is equal to zero all the time, due to shorted thyristor 144, as shown by curve 208.

As shown above, during motor acceleration, when thyristor pair 104 operates properly with a large angle α, current Ia is discontinuous. In other words, current Ia is zero for a portion of time immediately before it changes polarity. It is noted that curves 201–208 are for when load 102 is resistive. A resistive load is chosen for illustration purposes. If load 102 were a motor, the curves would not be the same, but would be similar, and the operation of this invention would not change.

During motor acceleration, therefore, LED pair 316, 318 emit light pulse 322 twice during every full cycle of input current from power supply 112. Thus, during motor acceleration, microprocessor 326 should receive two logic pulses for every cycle of power supply 112 input on line 130 if thyristors 142, 144 operate properly.

If load 102 were a motor, during motor acceleration the voltage across thyristor pair 104 pulsates, that is, it remains zero when thyristor pair 104 conducts and non-zero when thyristor pair 104 does not conduct. When one of the thyristors 142, 144 fails short, however, the pulsing ceases and the circuit output remains ideally zero, indicating a shorted thyristor of thyristor 142 or 144.

Thus, methods and systems consistent with this invention detect the voltage across thyristor pair 104. Methods and systems consistent with this invention indicate a shorted thyristor when microprocessor 326 determines that the voltage across thyristor pair does not pulse for a period of time during startup. Methods and systems consistent with this invention indicate a failed short thyristor when the voltage across the thyristor remains below a threshold value during the period of time during motor startup. The period of time may be a cycle or a half cycle, among other values.

The duration of the pulses is a function of the delay angle α. Microprocessor 326 uses a digital filter implemented in application program 328 to determine the average value of voltage generated by photo-coupler 310. If the average falls below a given threshold, a shorted thyristor indication for thyristor pair 104 is signaled.

Fault detectors 114 and 116 operate similarly to fault detector 110 in detecting faults in thyristor pairs 106 and 108, respectfully. Likewise, microprocessor 326 is connected to fault detectors 114 and 116 to detect short thyristor failures during motor acceleration.

Detection of Shorted Thyristor Failure Prior to Motor Startup

If load 102 is a motor, then prior to motor startup the motor is turned off, i.e., no thyristors are turned on. The motor behaves as a low impedance between each of the three supply lines 130, 132, and 136 from starter 150. The impedance of the first snubber network is much lower than the impedance of the failure detectors 110, but the impedance of first snubber network is much higher than the impedance of the motor when stopped. Thus, prior to motor startup, voltage Vad across failure detectors 110 is sinusoidal, and equal to voltage Van divided by the square root of three. Thus, one of LED pair 316, 318 conducts, and transistor 308 outputs a logic high.

If one of thyristors 142, 144 fails short, however, voltage Vad is ideally zero and transistor 308 outputs a logic low. Thyristor failure detection for thyristor pairs 106 and 108 operate similarly.

Methods and systems consistent with this invention detect voltage Vad across thyristor pair 104. If voltage Vad is continuously small compared to Van, a shorted thyristor is signaled. Similarly, methods and systems consistent with this invention also detect voltage Vbe across thyristor pair 106 and voltage Vcf across thyristor pair 108 to detect whether thyristors 145–148 failed short prior to motor startup.

Figure 4:
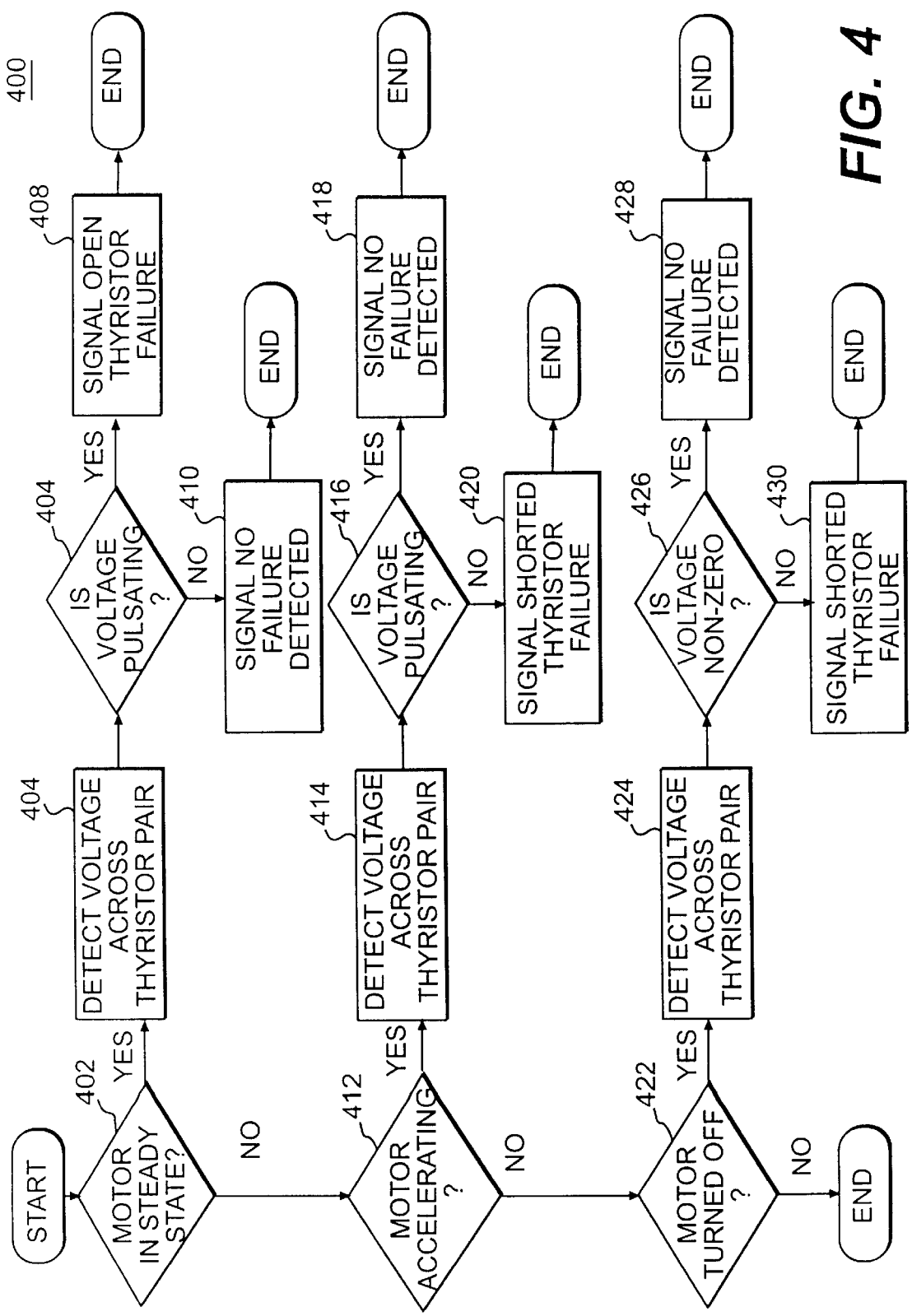
FIG. 4 is a flow chart, consistent with this invention, of a process for detecting failed thyristors in a thyristor pair.

FIG. 4 is a flow chart, consistent with this invention, of a process 400 for detecting failed thyristors in thyristor pair 104. In FIG. 3, memory 334 stores application 328 used to implement process 400.

First, systems and methods consistent with this invention determine whether the motor is in steady state (step 402). If the motor is in steady state, methods or systems consistent with this invention detect voltage Vad across thyristor pair 104 (step 404) and determine whether voltage Vad is pulsating (step 406). If the voltage is pulsating, then an open thyristor failure is signaled (step 408). If voltage Vad is not pulsating, then no failure is signaled (step 410).

Systems and methods consistent with this invention determine whether the motor is accelerating (step 412). If the motor is accelerating, methods or systems consistent with this invention detect voltage Vad across thyristor pair 104 (step 414) and determine whether voltage Vad is pulsating (step 416). If the voltage is pulsating, then no failure is signaled (step 418). If voltage Vad is not pulsating, then a shorted thyristor failure is signaled (step 420).

Systems and methods consistent with this invention determine whether the motor is turned off (step 422). If the motor is turned off, methods and systems consistent with this invention detect voltage Vad across thyristor pair 104 (step 424) and determine whether it is non-zero, or small compared to Van (step 426). If the voltage is non zero, then no failure is detected (step 428). If voltage Vad is zero, then a shorted thyristor failure is signaled (step 430).

Systems and methods consistent with this invention apply the steps of process 400 to a voltage Vbe across thyristor pair 106 in supply line 132 and to a voltage Vcf across thyristor pair 108.

Those skilled in the art recognize that various modifications and variations can be made in the preceding examples without departing from the scope or spirit of the invention. For example, even though the most commonly used controlled rectifier is the thyristor, any controlled rectifiers would suffice. Further, it is possible that the load be other than a motor; methods and systems consistent with this invention work with any type of load.

The description of the invention does not limit the invention. Instead, it provides examples and explanations to allow persons of ordinary skill to appreciate different ways to practice the invention. The following claims define the true scope and spirit of the invention.

What is claimed is:

1. An apparatus for detecting a failed short thyristor in a solid-state controller for delivering power to a load during reduced-voltage operation, said apparatus comprising:
   a voltage detector circuit comprising a resistor, a capacitor, and a light emitting diode for detecting a voltage across the thyristor, wherein the capacitator is configured to limit the current through the resistor and the light emitting diode; and
   a microprocessor coupled to the voltage detector circuit for indicating a failed short thyristor when the absolute value of the voltage across the thyristor remains below a threshold value during a predetermined period of time.

2. The apparatus of claim 1, wherein the load is a motor.

3. The apparatus of claim 1, wherein the predetermined period of time is one cycle of an input power to the controller.

4. The apparatus of claim 1, including a reverse light emitting diode connected parallel to the light emitting diode but with reverse polarity.

5. The apparatus of claim 1, wherein the capacitor, the resistor, and the light emitting diode are connected in series across the thyristor.

6. A method of detecting a failed short thyristor in a solid-state controller for delivering power to a load during reduced-voltage operation, said method comprising:
   detecting a voltage across the thyristor with a voltage detector comprising a resistor, a capacitor, and a light emitting diode, wherein the capacitor is configured to limit the current through the resistor and the light emitting diode; and
   indicating a failed short thyristor when the absolute value of the voltage across the thyristor remains below a threshold value during a predetermined period of time.

7. The method of claim 6, wherein the predetermined period of time is one cycle of an input power to the controller.

8. The method of claim 6, wherein the capacitor, the resistor, and the light emitting diode are connected in series across the thyristor.

9. An apparatus for detecting a failed short thyristor in a solid-state controller for delivering power to a load during reduced-voltage operation, said apparatus comprising:
   means for detecting a voltage across the thyristor with a voltage detector comprising a resistor, a capacitor, and a light emitting diode, wherein the capacitor is configured to limit the current through the resistor and the light emitting diode; and
   means for indicating a failed short thyristor when the absolute value of the voltage across the thyristor remains below a threshold value during a predetermined period of time.

10. The apparatus of claim 9, wherein the load is a motor.

11. The apparatus of claim 9, wherein the predetermined period of time is one cycle of an input power to the controller.

12. The apparatus of claim 9, wherein the capacitor, the resistor, and the light emitting diode are connected in series across the thyristor.

13. An apparatus for detecting a failed open thyristor in a solid-state controller for delivering power to a load during full-voltage operation, said apparatus comprising:
   a voltage detector circuit comprising a resistor, a capacitor, and a light emitting diode for detecting a voltage across the thyristor; and
   a microprocessor optically coupled to the voltage detector circuit for indicating a failed open thyristor when the absolute value of the voltage across the thyristor exceeds a threshold value.

14. The apparatus of claim 13, wherein the load is a motor.

15. The apparatus of claim 13, wherein the predetermined period of time is one cycle of an input power to the controller.

16. The apparatus of claim 13, including a reverse light emitting diode connected parallel to the light emitting diode but with reverse polarity.

17. The apparatus of claim 13, wherein the capacitor is configured to limit the current through the resistor and the light emitting diode.

18. The apparatus of claim 17, wherein the capacitor, the resistor, and the light emitting diode are connected in series across the thyristor.

19. A method of detecting a failed open thyristor in a solid-state controller for delivering power to a load during full-voltage operation, said method comprising:
   detecting a voltage across the thyristor; and indicating a failed open thyristor when the absolute value of the voltage across the thyristor exceeds a threshold value.

20. The method of claim 19, wherein the predetermined period of time is one cycle of an input power to the controller.

21. The method of claim 19, wherein detecting the voltage across the thyristor includes detecting the voltage across the thyristor with a voltage detector comprising a resistor, a capacitor, and a light emitting diode.

22. The method of claim 21, wherein the capacitor is configured to limit the current through the resistor and the light emitting diode.

23. The method of claim 22, wherein the capacitor, the resistor, and the light emitting diode are connected in series across the thyristor.

24. An apparatus for detecting a failed open thyristor in a solid-state controller for delivering power to a load during full-voltage operation, said apparatus comprising:

means for detecting a voltage across the thyristor; and means for indicating a failed open thyristor when the absolute value of the voltage across the thyristor exceeds a forward threshold voltage.

25. The apparatus of claim 24, wherein the load is a motor.

26. The apparatus of claim 24, wherein the means for detecting a voltage includes a voltage detector comprising a resistor, a capacitor, and a light emitting diode.

27. The apparatus of claim 26, wherein the capacitor is configured to limit the current through the resistor and the light emitting diode.

28. The apparatus of claim 27, wherein the capacitor, resistor, and light emitting diode are connected in series across the thyristor.

* * * * *

UNITED STATES PATENT AND TRADEMARK OFFICE
CERTIFICATE OF CORRECTION

PATENT NO. : 6,211,792 B1
DATED : April 3, 2001
INVENTOR(S) : Jadrić et al.

Page 1 of 1

It is certified that error appears in the above-identified patent and that said Letters Patent is hereby corrected as shown below:

<u>Title page,</u>
Item [54], Title, insert -- FOR -- after "APPARATUS".

Item [76], delete in its entirety and substitute therefore:

-- [75] Inventors: Ivan Jadrić; Harold R. Schnetzka; Gregory K. Beaverson, all of York, PA (US) --.

Item [74], "*Attorney, Agent or Firm* — Finnegan, Henserson," should read -- *Attorney, Agent or Firm* — Finnegan, Henderson, --.

Signed and Sealed this

Second Day of April, 2002

*Attest:*

*Attesting Officer*

JAMES E. ROGAN
*Director of the United States Patent and Trademark Office*